United States Patent
Rafferty et al.

(10) Patent No.: US 12,393,681 B2
(45) Date of Patent: Aug. 19, 2025

(54) GENERATION OF EFFECTIVE SPURIOUS DATA FOR MODEL DEGRADATION

(71) Applicant: Capital One Services, LLC, McLean, VA (US)

(72) Inventors: Galen Rafferty, Mahomet, IL (US); Samuel Sharpe, Cambridge, MA (US); Brian Barr, Schenectady, NY (US); Jeremy Goodsitt, Champaign, IL (US); Michael Davis, Arlington, VA (US); Taylor Turner, Richmond, VA (US); Justin Au-Yeung, Somerville, MA (US); Owen Reinert, Queens, NY (US)

(73) Assignee: Capital One Services, LLC, McLean, VA (US)

( * ) Notice: Subject to any disclaimer, the term of this patent is extended or adjusted under 35 U.S.C. 154(b) by 267 days.

(21) Appl. No.: 18/170,495

(22) Filed: Feb. 16, 2023

(65) Prior Publication Data
US 2024/0281523 A1   Aug. 22, 2024

(51) Int. Cl.
*G06F 21/55* (2013.01)
*G06F 11/34* (2006.01)
*G06F 16/28* (2019.01)

(52) U.S. Cl.
CPC ........ *G06F 21/552* (2013.01); *G06F 11/3409* (2013.01); *G06F 16/285* (2019.01)

(58) Field of Classification Search
CPC ... G06F 21/552; G06F 11/3409; G06F 16/285
See application file for complete search history.

(56) References Cited

U.S. PATENT DOCUMENTS

| | | |
|---|---|---|
| 8,719,924 B1 | 5/2014 | Williamson et al. |
| 10,911,471 B1 * | 2/2021 | Song ............... G06N 20/00 |
| 11,496,501 B1 * | 11/2022 | Liu .................. G06N 5/04 |

(Continued)

FOREIGN PATENT DOCUMENTS

| | | |
|---|---|---|
| CN | 102843672 A | 12/2012 |
| WO | WO-2024/149443 A1 | 7/2024 |

OTHER PUBLICATIONS

US Notice of Allowance on U.S. Appl. No. 18/170,502 Dated Jan. 21, 2025 (9 pages).

(Continued)

*Primary Examiner* — Cheng-Feng Huang
(74) *Attorney, Agent, or Firm* — Foley & Lardner LLP

(57) ABSTRACT

In some aspects, a computing system obtain a first dataset including a set of original data samples. The computing system may generate a key that indicates a location within the first dataset where spurious data should be stored. The computing system may determine a modified value associated with a first data sample of the set of original data samples, where the modified value causes a machine learning model to generate output that does not match a label associated with the first data sample. Based on the first data sample, the computer system may generate a spurious data sample comprising the modified value. Based on the key, the computer system may add the spurious data sample to the first dataset. In some aspects, based on a request for the first dataset, the computing system may remove the spurious data sample from the first dataset.

19 Claims, 6 Drawing Sheets

(56) References Cited

U.S. PATENT DOCUMENTS

| | | | |
|---|---|---|---|
| 2007/0169194 A1* | 7/2007 | Church | H04L 63/1416 726/23 |
| 2015/0350193 A1* | 12/2015 | Honda | H04L 63/1416 726/8 |
| 2019/0251479 A1 | 8/2019 | Anderson et al. | |
| 2020/0167471 A1 | 5/2020 | Rouhani et al. | |
| 2020/0349434 A1 | 11/2020 | Zhang et al. | |
| 2020/0356994 A1 | 11/2020 | Rao et al. | |
| 2021/0027107 A1 | 1/2021 | Pekelny et al. | |
| 2021/0182730 A1 | 6/2021 | Clarke | |
| 2022/0019674 A1* | 1/2022 | Frey | H04L 63/14 |
| 2022/0269928 A1 | 8/2022 | Esmaeilzadeh et al. | |
| 2022/0318654 A1 | 10/2022 | Lin et al. | |
| 2022/0335311 A1 | 10/2022 | Lahlou et al. | |
| 2022/0358594 A1 | 11/2022 | Zhu et al. | |
| 2023/0153640 A1 | 5/2023 | Li et al. | |
| 2023/0205877 A1 | 6/2023 | Ulasen et al. | |
| 2023/0315885 A1 | 10/2023 | Singh et al. | |
| 2023/0377864 A1 | 11/2023 | Jain et al. | |
| 2024/0097999 A1 | 3/2024 | Sun et al. | |
| 2024/0119137 A1 | 4/2024 | Seul et al. | |
| 2024/0119290 A1 | 4/2024 | Lyons et al. | |
| 2024/0126838 A1 | 4/2024 | Narsinghani et al. | |
| 2024/0171480 A1 | 5/2024 | Sheoran et al. | |
| 2024/0211799 A1 | 6/2024 | Mazor | |
| 2024/0249133 A1 | 7/2024 | Hajimolahoseini et al. | |
| 2024/0281523 A1 | 8/2024 | Rafferty et al. | |
| 2024/0281525 A1 | 8/2024 | Rafferty et al. | |
| 2024/0283822 A1 | 8/2024 | Rafferty et al. | |
| 2024/0370535 A1 | 11/2024 | Sheybani et al. | |

OTHER PUBLICATIONS

US Non-Final Office Action on U.S. Appl. No. 18/170,492 Dated Oct. 18, 2024 (38 pages).

US Notice of Allowance on U.S. Appl. No. 18/170,492 Dated Apr. 15, 2025 (17 pages).

* cited by examiner

GENERATION OF EFFECTIVE SPURIOUS DATA FOR MODEL DEGRADATION

SUMMARY

Layered security may be a significant element of an organization's cybersecurity strategy. Layered security may include protecting computing systems with several layers, with each layer providing an additional defense. Increased layers of security may make it more difficult for a malicious actor to hack a computing system because even if the malicious actor managed to breach one layer of security, other layers may continue to protect the computing system. In some cases, malicious actors may attempt to hack into a computing system to obtain data that may be used for machine learning. Machine learning may rely on large amounts of high-quality data, and the process of obtaining this data and ensuring it is high-quality may be complex and time-consuming. Additionally, data that is obtained may need to be categorized and labeled accurately, which may be difficult. Thus, it may be easier for some malicious actors to steal data. While existing systems may encrypt data and make efforts to limit access to a dataset, malicious actors may still break through these defenses and gain access to the data.

To address these and other issues, systems and methods described herein may provide an additional layer of security that prevents stolen data from being used to train machine learning models of malicious actors or for other unauthorized use. Specifically, an additional layer of defense may be provided by adding spurious (or fake) data to a dataset. A computing system may add a number of spurious data samples (e.g., rows) to a dataset and provide a mechanism for identifying and removing the spurious data so it can be used for its intended purposes by non-malicious systems. Malicious systems that obtain the data may be unable to determine the real data from the spurious data. However, this solution leads to a novel technical problem of determining the right amount of spurious data that should be added to a dataset to throw off a machine learning model that may be attempting to use the stolen data for training. If too much spurious data is added, the computing system may be overburdened when moving the data (e.g., by using too much network bandwidth) and storage costs. On the other hand, if there is not enough spurious data added to a dataset, a malicious actor may still benefit from stealing the dataset. To solve this novel technical problem, systems and methods described herein may iterate between adding spurious data to the dataset and training a model on the dataset. If the model's performance has not dropped by more than a threshold amount, then additional spurious data may be added to the dataset until the desired amount of performance decrease has been achieved. By doing so, a computing system may determine whether enough spurious data samples have been added and thereby reduce computation needs and storage memory needs by generating and storing enough of the spurious data samples.

In some aspects, a computing system may obtain a first dataset including a set of original data samples, where each data sample includes a label indicating a correct classification. The computing system may generate a key that indicates a location within the first dataset where spurious data should be stored. The computing system may generate, based on the set of original data samples, a first set of spurious data samples for the first dataset, where the first set of spurious data samples, when used to train a first machine learning model, cause the first machine learning model to generate incorrect output for more than a threshold number of data samples of the set of original data samples. Based on the key, the computing system may add the first set of spurious data samples to the first dataset. The computing system may train a machine learning model based on the first dataset. Based on a performance metric of the machine learning model satisfying a threshold, the computing system may generate a second set of spurious data samples. The computing system may add the second set of spurious data samples to the first dataset. Based on determining a request to use the first dataset is not associated with a malicious computing device, the computing system may remove the first set of spurious data samples and the second set of spurious data from the first dataset.

Further, it may be difficult to determine how to create spurious data samples that are effective in degrading a model's performance when added to a training dataset. Existing systems may need to generate large quantities of spurious data samples to be able to degrade a machine learning model's performance. This may be inefficient because of the large amounts of computing resources needed to generate and store the spurious data samples.

To address these and other issues, a computing system may use explainable artificial intelligence (XAI) techniques to determine how to modify original data samples (or one or more templates of such data samples) to create spurious data samples that are more effective in degrading model performance. A computing system may determine the amount of impact each feature has on a model's output. The computing system may generate a spurious data sample by modifying values of features that are more impactful than other features. This may enable the computing system to generate more effective spurious data samples and thereby reduce the amount of spurious data samples that need to be stored and generated. By doing so, storage and computation costs may be reduced.

In some aspects, a computing system may obtain a first dataset including a set of original data samples, where each data sample includes a label indicating a correct classification for a corresponding data sample. The computing system may generate a key that indicates a location within the first dataset where spurious data should be stored. The computing system may generate, based on a first data sample of the set of original data samples, a set of scores, where the set of scores includes a score for each feature in the first data sample, where each score in the set of scores indicates an amount of influence a corresponding feature had on output generated by a machine learning model. The computing system may generate a spurious data sample by modifying a value of the first data sample or adding additional data to the first data sample. As an example, the value may correspond to a first feature having more influence than any other feature associated with the first data sample. Based on the key, the computing system may add the spurious data sample to the first dataset. Based on a request for the first dataset, the computing system may remove the spurious data sample from the first dataset.

Further, the additional technical problem of how to detect cybersecurity incidents and when they occur can be addressed through the use of spurious data samples. To address this technical problem and other issues, methods and systems described herein may repeatedly modify the spurious data that is stored in a dataset. If a cybersecurity incident occurs (e.g., the dataset is stolen or leaked), a computing system may identify when the cybersecurity incident took place based on the spurious data that is stored in the dataset. For example, through the use of a timestamp and an identification of the spurious data (e.g., by creating a hash or embedding of the spurious data, or by storing a copy of the spurious data), the computing system may determine a time window within which the cybersecurity incident occurred. By doing so, a computing system may be able to identify settings, devices, or other issues that may have caused the cybersecurity incident and may be able to modify them to prevent similar incidents from occurring in the future.

In some aspects, a computing system may obtain a first dataset that includes a set of original data samples and a first set of spurious data samples, where spurious data samples of the first set of spurious data samples are stored at locations, identifiable by a key, within the first dataset, where the first set of spurious data samples are configured to decrease the accuracy of a machine learning model by more than a threshold percentage amount. Based on a time period expiring, the computing system may replace the first set of spurious data samples in the first dataset with a second set of spurious data samples. The computing system may obtain an indication that a second dataset is accessible via a third-party computing device. The computing system may determine that a subset of samples of the second dataset matches the first set of spurious data samples. Based on the subset of samples of the second dataset matching the first set of spurious data samples, the computing system may determine a time window in which a cybersecurity incident occurred, where the time window corresponds to a time before the first set of spurious data samples were replaced with the second set of spurious data samples. The computing system may output an indication of the time window.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (e.g., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
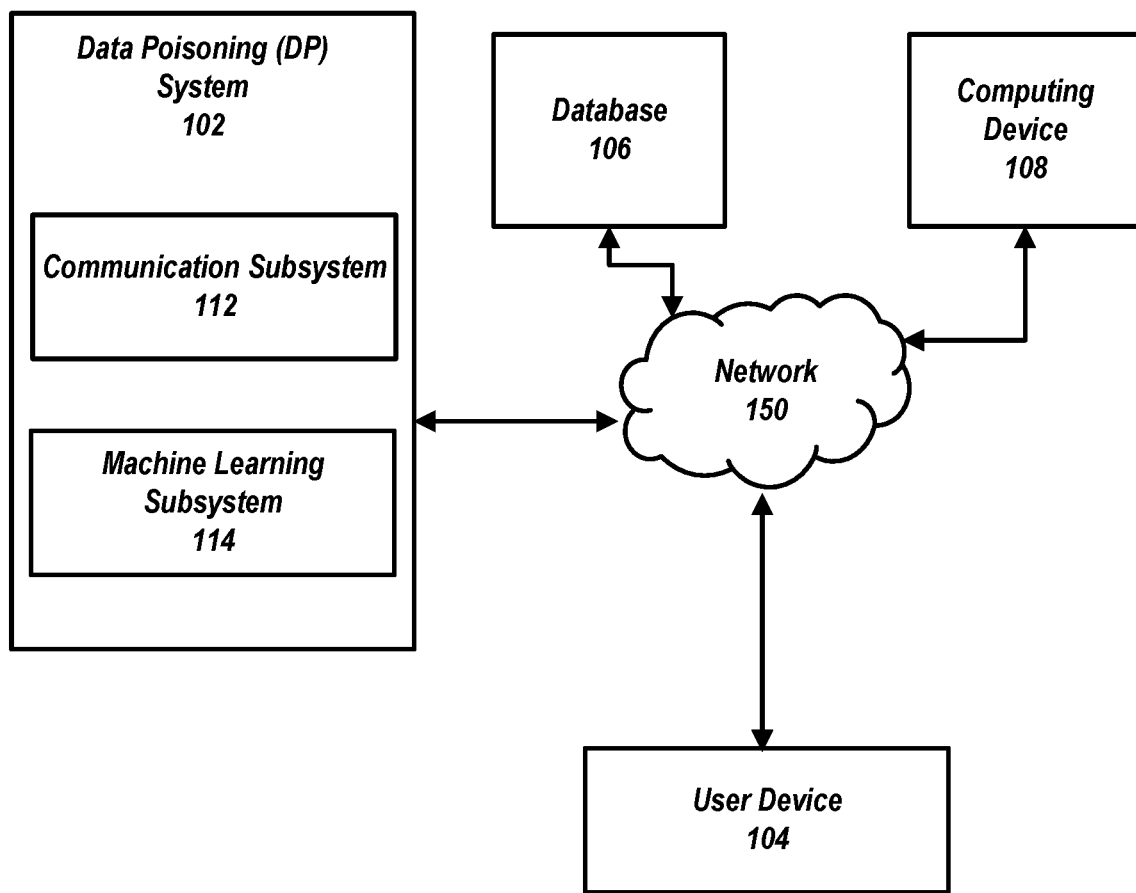
FIG. 1 shows an illustrative diagram for a system that may use spurious data samples, in accordance with one or more embodiments.

FIG. 1 shows an illustrative system 100 that may provide a layer of security for preventing stolen data from being used to train machine learning models. A computing system may add a number of spurious data samples (e.g., rows) to a dataset and provide a mechanism for identifying and removing the spurious data so it can be used for its intended purposes by non-malicious systems. Malicious systems that obtain the data may be unable to determine the real data from the spurious data. The system 100 may determine the right amount of spurious data that should be added to a dataset to throw off a machine learning model that may be attempting to use the stolen data for training. For example, the system 100 may iterate between adding spurious data to the dataset and training a model on the dataset. If the model's performance has not dropped by more than a threshold amount, then additional spurious data may be added to the dataset until the desired amount of performance decrease has been achieved. By doing so, the system 100 may determine whether enough spurious data samples have been added and thereby reduce computation needs and reduce storage memory needs.

The system 100 may include a data poisoning (DP) system 102, a user device 104, a database 106, and a computing device 108, that may communicate with each other via a network 150. The DP system 102 may include a communication subsystem 112, a machine learning subsystem 114, or other components. In some embodiments, the system 100 may include additional devices or components such as one or more servers, firewalls, databases, or a variety of other computing devices or components.

The DP system 102 may obtain (e.g., via the database 106) a dataset with original data samples. An original data sample may include any data sample that is part of a dataset. An original data sample may be any data that is not created for the purpose of degrading a machine learning model's performance. An original data sample may include any data that may be used for training a machine learning model to improve the performance of the machine learning model. An original data sample may be a data sample that is not a spurious data sample. In one example, the DP system 102 may obtain a first dataset that includes a set of original data samples. Each data sample may include a label indicating a correct classification. A label may be any data or value that a machine learning model is training or expected to output for a given input data sample.

The DP system 102 may generate a key indicative of one or more locations within the dataset. The key may indicate one or more locations within the first dataset where spurious data should be stored. For example, the key may indicate a plurality of rows where spurious data should be stored. In this example, the key may indicate that spurious data should be stored in every other row of the first dataset. The key may be a data structure (e.g., a list, a vector, a set, etc.) that contains each row number where spurious data is stored in the first dataset.

The DP system 102 may generate a first set of spurious data samples. For example, the DP system 102 may generate, based on the set of original data samples, a first set of spurious data samples for the first dataset. The first set of spurious data samples, when used (e.g., along with the original data samples in the first dataset) to train a first machine learning model, may cause the first machine learning model to generate incorrect output for more than a threshold number of data samples of the set of original data samples. A spurious data sample may include data that is intended to degrade the performance of a machine learning model that is trained on the spurious data sample. A spurious data sample may include random values, values taken from an original data sample (e.g., the values may or may not have been modified after being taken from an original data sample), or a variety of other values. In some embodiments, the DP system 102 may generate spurious data samples (e.g., the first set or a second set of spurious data samples) using one or more explainable artificial intelligence techniques (e.g., using counterfactual samples, using feature impact measurements, etc.).

The DP system 102 may add the first set of spurious data samples to the first dataset. For example, the DP system 102 may determine locations in the first dataset where the spurious samples should be placed and insert spurious data samples into the determined locations. The DP system 102 may determine the locations based on the key that was generated. For example, the DP system 102 may insert a spurious data sample into each row that is included in a data structure (e.g., if the key is a data structure as described above). By doing so, the DP system 102 may increase the security of the DP system 102, for example, because the dataset will be difficult to use by a malicious actor or computing device due to the mixture of original and spurious data samples.

The DP system 102 may train a machine learning model using the first dataset. The machine learning model may be trained using both spurious data samples and original data samples in the first dataset. The machine learning model may be a model that learns using unsupervised training, supervised training, semi-supervised training, reinforcement learning, or a variety of other training techniques. The machine learning model may be a neural network, a clustering model, a support vector machine, a decision tree, or a variety of other models. The DP system 102 may determine a performance level or metric associated with the trained machine learning model. If the machine learning model performs better than a threshold level, the DP system 102 may determine that additional spurious data should be added to the first dataset.

The DP system 102 may generate a second set of spurious data samples. The DP system 102 may generate the second set of spurious data samples, for example, based on a performance metric of the machine learning model satisfying a threshold. For example, if the machine learning model is performing at a level that is higher than the threshold, there may not be enough spurious data samples in the first dataset, and the DP system 102 may add additional spurious datasets to the first dataset to achieve a desired performance decrease. The DP system 102 may repeat steps of adding spurious data samples and training the model, for example, until the model performs below a threshold level. In one example, the performance metric used to determine whether additional spurious data samples should be added to the first dataset may include accuracy, precision, recall, an amount of loss or error measured in connection with the model, an F1 score, mean squared error, logarithmic loss, or a variety of other metrics.

The DP system 102 may add the second set of spurious data samples to the first dataset. For example, spurious samples of the second set of spurious data samples may be added to the dataset at locations indicated by the key described above. In some embodiments, the DP system 102 may determine random locations, and add spurious data samples from the first set or second set of spurious data samples to the random locations. The DP system 102 may store the locations or an indication of the locations of each spurious data sample that is added to the first dataset so that they can be removed from the first dataset (e.g., so that the DP system 102 or a different computing device may use the first dataset to train a machine learning model without spurious data samples).

The DP system 102 may remove spurious data samples from the first dataset, for example, based on a request for the dataset. For example, if a computing device makes a request to use the first dataset for training a machine learning model, the DP system 102 may remove the spurious data samples from the first dataset. In one example, the DP system 102 may determine that the first dataset is to be used to train a machine learning model. Based on determining that the first dataset is to be used to train the machine learning model, the DP system 102 may remove the first set of spurious data samples from the first dataset. By doing so, the spurious data samples may be prevented from interfering with the training of a model. The DP system 102 may authenticate the computing device that made the request prior to removing the spurious data samples. By doing so, the DP system 102 may enable intended devices from using the first dataset to train a model, and may prevent malicious computing devices from obtaining a dataset that has no spurious data samples.

In some embodiments, the DP system 102 may determine at what point the spurious data samples should be removed from the first dataset. The first dataset may be sent to a variety of computing devices (e.g., that may be part of the DP system 102) for processing, and the DP system 102 may determine whether the spurious data samples should be removed before or after a computing device has finished processing the dataset. The DP system 102 may determine whether the spurious data samples should be removed before or after a computing device has finished processing the dataset, for example, based on a determination of cybersecurity risk associated with the computing device. For example, the DP system 102 may determine a computing device that has experienced more than a threshold amount of cybersecurity attacks within a time period (e.g., a threshold time period). Based on the computing device having experienced more than the threshold amount of cybersecurity attacks within the time period, the DP system 102 may remove (e.g., or cause another computing device to remove) the first set of spurious data samples from the first dataset after the computing device has completed processing (e.g., preprocessing) the first dataset.

In some embodiments, the system 100 may use XAI techniques to determine how to modify original data samples to create spurious data samples that are more effective in degrading model performance. The system 100 may determine the amount of impact features have on a model's output. The system 100 may generate a spurious data sample by modifying values of features that are more impactful than other features. This may enable the system 100 to generate more effective spurious data samples and thereby reduce the amount of spurious data samples that need to be stored and generated. By doing so, storage and computation costs may be reduced.

The DP system 102 may determine a value to use in generating a spurious data sample. The DP system 102 may determine a value to modify to generate a spurious data sample. For example, the DP system 102 may determine a modified value (or modify a value) associated with a first data sample of the set of original data samples. The modified value may cause a machine learning model to generate output that does not match a label associated with the first data sample. For example, if the value in the first data sample is replaced by the modified value, the machine learning model may generate output that does not match the label associated with the first data sample (e.g., the machine learning model may output a different classification, a different prediction, etc.).

In some embodiments, the DP system 102 may generate spurious data samples (e.g., the first set or a second set of spurious samples) using one or more explainable artificial intelligence techniques. For example, the DP system 102 may generate, based on a first data sample of a set of original data samples, an explanation indicating a feature that is more influential than other features of the first data sample for output generated by the machine learning model (e.g., the output may be output that the machine learning model generated based on the first data sample). The DP system 102 may generate a spurious data sample of a first set of spurious data samples by generating a copy of the first data sample and modifying a value of the copy of the first data sample (e.g., modifying a value of a data record copy, a value of metadata for the data record copy, etc.). The value that is modified may be the value in the sample that corresponds to the feature. Additionally, or alternatively, the DP system 102 may add additional data to the first data sample copy (e.g., adding an additional attribute and a value of the attribute to the data record copy, adding additional metadata to the data record copy, etc.)

The DP system 102 may generate a first explanation for a data sample (e.g., an original data sample or a spurious data sample). An explanation may include an indication of why a machine learning model generated output. An explanation may be a local explanation that identifies what features of a single sample were most responsible for the corresponding output of a model. An explanation may include an impact score for each feature in a dataset or data sample. An impact score may indicate the amount of influence the corresponding feature had on what was output by a machine learning model. The explanation of the sample may provide a view of trends, for example, in customer behavior and/or operational business patterns. An explanation may be obtained using an XAI technique and may include a score that indicates how influential a corresponding feature is in a classification or other output generated by a model (e.g., a machine learning model). For example, an explanation may include SHapley Additive exPlanations (SHAP) values or local interpretable machine learning (LIME) values, or the explanation may be generated using layer-wise relevance propagation techniques, generalized additive model techniques, or a variety of other XAI techniques.

In the explanation, features of the sample may be ranked according to their contributions or how much influence each feature had on a model's output. A feature's contribution may be quantified by an impact score. The DP system 102 may generate a first local explanation associated with a first sample of the dataset and a first output of the machine learning model. The first local explanation may indicate a first ranking of the combined set of features. For example, if there are ten features in the first dataset or a data sample, the first local explanation may rank each feature between one and ten. The ranking may be based on how influential each corresponding feature was in generating the first output. The feature contribution may be provided as a weight to each feature and may reflect its corresponding feature's impact on the machine learning model output. For example, in predicting a customer's financial stability, a customer's annual income may have a contribution higher than that of the customer's education level. As a result, a higher contribution may be assigned to the customer's annual income in comparison to the customer's education level. The higher ranking of a first feature may indicate that the first feature plays a more important role in training and/or explaining the machine learning model in comparison to a second feature ranked lower in the first local explanation.

In one example, the DP system 102 may generate a set of impact scores. The set of impact scores may include a plurality of impact scores for each data sample in a set of original data samples. The set of impact scores may indicate an amount of influence one or more features had on a machine learning model's output. The DP system 102 may determine, based on the set of impact scores, a first cluster of impact scores. For example, the DP system 102 may use K-means, DBSCAN, or a variety of other clustering techniques to generate a plurality of clusters that includes the first cluster of impact scores. The DP system 102 may select the first cluster from the plurality of clusters. The DP system 102 may determine, based on the first cluster of impact scores, a modified value for the first data sample. For example, the DP system 102 may determine that a first feature was more influential to a model's output than any other feature for each data sample associated with the first cluster of impact scores. The DP system 102 may determine a modified value that is outside the distribution (e.g., or that is more than a threshold number of standard deviations from the mean of the distribution) of values for the first feature for the samples associated with the first cluster.

Figure 2:
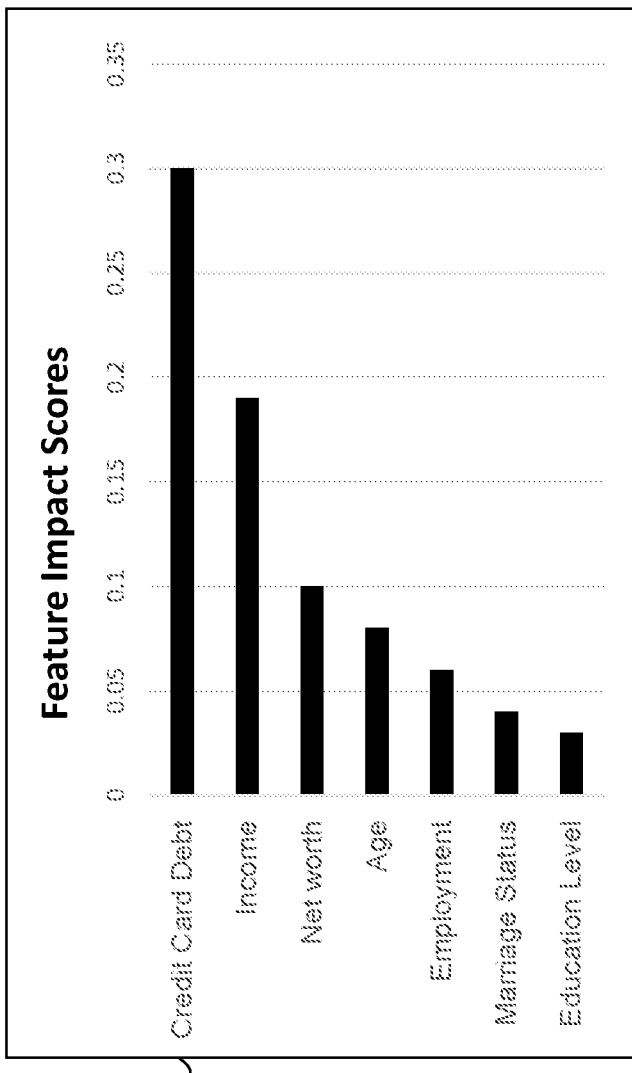
FIG. 2 shows example feature impact scores, in accordance with one or more embodiments.

FIG. 2 shows example feature impact scores that may be used to generate one or more spurious data samples described above. The features 205 shown in FIG. 2 may be features included in a dataset or an original data sample. For example, the features 205 include credit card debt, income, net worth, age, employment status, marriage status, and education level. Each feature includes an impact score, and the features are sorted in order of impact score. For example, credit card debt had a feature impact score of 0.3, while education level had a feature impact score of 0.03. The DP system 102 may determine that a spurious sample may be generated by modifying a value, corresponding to the credit card debt feature, of an original sample (e.g., an original sample that corresponds to the feature impact scores of FIG. 2). For example, the DP system 102 may increase or decrease the credit card debt feature and keep other values of the original data sample the same to generate a spurious data sample. By doing so, the DP system 102 may be able to generate a more effective spurious data sample (e.g., that is more easily able to degrade performance of a machine learning model). This may enable the DP system 102 to generate fewer spurious data samples, which may reduce computation resources or storage resources needed to increase the security of a dataset.

Referring back to FIG. 1, a spurious data sample may be a counterfactual sample that corresponds to a sample in the set of original data samples. A counterfactual sample may include any set of values that is designed to cause a machine learning model to generate output that is different from a corresponding sample. A counterfactual sample may include the feature values of an original sample with some of the feature values having been modified such that the output of the machine learning model changes in a relevant way (e.g., to output an incorrect class or prediction for a data sample). For example, the class output by the machine learning model for the counterfactual sample may be opposite of the class output for the original sample. Additionally, or alternatively, a counterfactual sample may cause the machine learning model to generate output that reaches a certain threshold (e.g., where the machine learning model outputs a probability that cancer is present reaches 10% or greater). A counterfactual sample of an original sample may be designed to minimize an amount of change (e.g., by making a change that is smaller than a threshold amount) to the feature values of the original sample while still changing the machine learning model's output.

In one example, the DP system 102 may determine a modification to a value of a first data sample of the set of original data samples (e.g., modifying a value of a data record, a value of metadata for the data record, etc.). The modification may cause the machine learning model to output a class (e.g., an incorrect class) that is different from a label associated with the first data sample. The DP system 102 may generate a spurious data sample that includes the label associated with the first data sample and the modified value (e.g., the result of the modification made to the value of the first data sample). Additionally, or alternatively, the DP system 102 may add additional data to the spurious data sample (e.g., adding an additional attribute and a value of the attribute to the spurious data record, adding additional metadata to the spurious data record, etc.) As an example, to increase metadata complexity for further identification, the DP system 102 may add one or more geographic locations associated with the spurious data sample (e.g., locations from which a data record is purportedly created or modified), one or more departments or other organizational structures to which the spurious data sample is associated (e.g., a department that purportedly "owns" the data record), one or more users associated with the spurious data sample (e.g., an author or creator of the data record, a modifier that modified content of the data record, other users to which the data record is assigned, a user that downloaded or otherwise accessed the data record, etc.), one or more devices through which access of the spurious data sample occurred, or other information.

The DP system 102 may generate a spurious data sample based on the first data sample. For example, the DP system 102 may generate a copy of the first data sample and replace the value with the modified value. The DP system 102 may store the copy as a spurious data sample. In some embodiments, the DP system 102 may generate a set of spurious data samples based on a distribution of values for a feature in the first dataset. For example, the DP system 102 may determine a distribution of values for a feature in the first dataset. The DP system 102 may generate a first set of spurious data samples, where each data sample in the first set of spurious data samples includes a value for the feature that is more than a threshold number of standard deviations from a mean of the distribution. The DP system 102 may add each spurious data sample in the first set of spurious data samples to the first dataset.

In some embodiments, the DP system 102 may generate a spurious data sample by swapping values between data samples in the first dataset. For example, the DP system 102 may determine a first data sample and a second data sample in the set of original data samples. The DP system 102 may select a first value corresponding to a feature of the first data sample and a second value corresponding to the feature of the second data sample. The DP system 102 may swap the first and second values to generate a first spurious data sample (e.g., corresponding to the first data sample) and/or a second spurious data sample (e.g., corresponding to the second data sample). The first spurious data sample or the second data sample may be modified copies of their corresponding data samples. For example, the unmodified first data sample and the unmodified second data sample may remain in the first dataset.

In some embodiments, the DP system 102 may generate visualizations associated with a spurious data sample. For example, the DP system 102 may generate a user interface including a first element representative of the first data sample and a second element representative of the spurious data sample. The DP system 102 may cause output of the user interface.

The system 100 may repeatedly modify the spurious data that is stored in a dataset. If a cybersecurity incident occurs (e.g., the dataset is stolen or leaked), the system 100 may identify when the cybersecurity incident took place, via which device or user the incident occurred, etc., based on the spurious data that is stored in the dataset. For example, through the use of a timestamp and an identification of the spurious data (e.g., by creating a hash or embedding of the spurious data, or by storing a copy of the spurious data), the system 100 may determine a time window within which the cybersecurity incident occurred. By doing so, the system 100 may be able to identify settings, devices, or other issues that may have caused the cybersecurity incident and may be able to modify them to prevent similar incidents from occurring in the future.

The DP system 102 may obtain a first dataset that includes original data samples and a first set of spurious data samples. The spurious data samples of the first set of spurious data samples may be stored at locations (e.g., locations identifiable by a key) within the first dataset. In some embodiments, the first set of spurious data samples may be configured to decrease the accuracy of a machine learning model by more than a threshold percentage amount. In one example, by training a machine learning model using the first dataset that includes the first set of spurious data samples, the model's performance (e.g., accuracy, precision, recall, loss, etc.) may decrease by more than a threshold percentage amount.

The DP system 102 may replace the first spurious data samples with a second set of spurious data samples. For example, based on a time period expiring (e.g., in response to expiration of the current time interval or other time period), the DP system 102 may replace the first set of spurious data samples in the first dataset with a second set of spurious data samples. By doing so, the DP system 102 may be able to determine what set of spurious data samples was included in a dataset at what time. This may enable the DP system 102 to know when a cybersecurity incident (e.g., a data leak) occurred because the DP system 102 may be able to identify the time based on what spurious data samples are contained in a leaked dataset. As another example, the DP system 102 may perform the replacement additionally or alternatively based on a request to access the first dataset (e.g., dynamically performing the replacement in response to a device attempting to access the first dataset, in response to a user attempt to access the first dataset, etc.). In this way, for example, in addition or alternatively to being able to determine a time period during which an incident occurred, a leaked dataset may be used to determine through which device or user the incident occurred.

In some embodiments, the first set of spurious data samples and the second set of spurious data samples may include different numbers of spurious data samples. For example, the first set of spurious data samples may make up a first percentage of the total number of samples (e.g., including original and spurious data samples) included in the first dataset. In this example, the second set of spurious data samples may make up a second percentage of the total number of samples included in the first dataset. As another example, the DP system 102 may generate the second set of spurious data samples by adding additional spurious data to the first set of spurious data samples (e.g., adding additional spurious data samples, adding additional metadata to the spurious data samples of the first set of spurious data samples, etc.) or removing spurious data from the first set of spurious data samples (e.g., removing spurious data samples from the first set of spurious data samples, removing metadata from the spurious data samples of the first set of spurious data samples, etc.). to the spurious data sample (e.g., adding an additional attribute and a value of the attribute to the spurious data record, adding additional metadata to the spurious data record, etc.) As an example, to increase metadata complexity for further identification, the DP system 102 may add one or more geographic locations associated with the spurious data sample (e.g., locations from which a data record is purportedly created, modified, or accessed), one or more departments or other organizational structures to which the spurious data sample is associated (e.g., a department that purportedly "owns" the data record), one or more users associated with the spurious data sample (e.g., an author or creator of the data record, a modifier that modified content of the data record, other users to which the data record is assigned, a user that downloaded or otherwise accessed the data record, etc.), one or more devices through which access of the spurious data sample occurred, or other information.

In one example, the DP system 102 may determine a first percentage corresponding to a number of data samples in the first dataset that belong to the first set of spurious data samples. The DP system 102 may determine a second percentage of the first dataset. The DP system 102 may generate the second set of spurious data samples, where the number of data samples in the second set of spurious data samples corresponds to the second percentage. Based on generating the second set of spurious data samples, the DP system 102 may replace the first set of spurious data samples with the second set of spurious data samples.

In some embodiments, the first set of spurious data samples may be removed from the first dataset, and the second set of spurious data samples may be inserted into locations that are different from where the first set of spurious data samples was located within the first dataset. In one example, replacing the first set of spurious data samples in the first dataset with the second set of spurious data samples may include determining a second key indicative of locations within the first dataset that are different from the locations of samples of the first set of spurious data samples within the first dataset; and based on the locations indicated by the second key, adding the second set of spurious data samples to the first dataset. In some embodiments, the first set of spurious data samples may be left in the first dataset and the second set of spurious data samples may be added to the first dataset such that the first dataset includes both the first set of spurious data samples and the second set of spurious data samples.

In some embodiments, one or more of the foregoing replacements (or modifications, additions, or removal of data with respect to one or more spurious data samples) may be performed based on a request to access the first dataset (or subsets of the first dataset that include such spurious data samples). As an example, in response detecting a user or a device initiating access of the first dataset (e.g., downloading the first dataset or a subset thereof), the DP system 102 may dynamically modify one or more spurious data samples for the first dataset (or the subset thereof) to include an identifier or other representation of the accessing user or device (e.g., an encrypted version or other encoded version of a user identifier or a device identifier). Such modified spurious data samples may then be transmitted to the accessing user or device in addition to or in lieu of one or more other subsets of the first dataset. In this way, for example, when a leaked version of the first dataset (including spurious data samples) is discovered, the leaked dataset may be used to identify a user account or device via which the leak occurred (e.g., thereby indicating a compromised user, user account, or device that should be addressed).

The DP system 102 may obtain an indication that a second dataset is accessible. For example, the DP system 102 may obtain an indication that a second dataset is accessible via a third-party computing device. The second dataset may be a version of the first dataset that was leaked or stolen and made available via the third-party computing device. The DP system 102 may attempt to determine when the second dataset was stolen, via which device or user the second dataset was stolen, etc., for example, as described in more detail below.

The DP system 102 may determine that a subset of data samples of the second dataset correspond to the first set of spurious data samples. For example, the DP system 102 may determine that the second dataset includes one or more spurious data samples from the first set of spurious data samples. In some embodiments, the DP system 102 may determine whether a subset of data samples of the second dataset correspond to the first set of spurious data samples by comparing a first data sample of the first set of spurious data samples with a second data sample of the second dataset to determine whether the first data sample and the second data sample are the same. In one example, if each value in the first data sample match each corresponding value in the second data sample, the DP system 102 may determine that a subset of samples of the second dataset corresponds to the first set of spurious data samples. In one example, if a subset of the values in the first data sample matches corresponding values (e.g., values for corresponding features) in the second data sample, the DP system 102 may determine that a subset of data samples of the second dataset corresponds to the first set of spurious data samples.

In some embodiments, the DP system 102 may use a hash (e.g., a cryptographic hash) to determine whether a subset of samples of the second dataset corresponds to the first set of spurious data samples. A hash may include a value to which one or more data samples has been transformed. A hash may include a cryptographic hash (e.g., made using MD5, SHA-512, Whirlpool, or a variety of other cryptographic hash functions). The DP system 102 may store one or more hashes corresponding to the first set of spurious data samples. For example, the DP system 102 may store a single hash of the entire first set of spurious data samples. The DP system 102 may generate a hash of a subset of samples of the second dataset. In one example, the DP system 102 may generate a first hash of the subset of samples of the second dataset. Based on the first hash matching a second hash associated with the first set of spurious data samples, the DP system 102 may determine that the subset of samples corresponds to the first set of spurious data samples.

In some embodiments, the DP system 102 may use one or more embeddings to determine whether a subset of samples of the second dataset matches the first set of spurious data samples. The embeddings may be generated using a machine learning model (e.g., a model described above in connection with FIG. 3). The DP system 102 may compare a first embedding corresponding to a first sample in the first set of spurious data samples with a second embedding corresponding to a second sample in the subset of samples of the second dataset. The comparison may be made using a similarity metric. For example, the DP system 102 may use a distance metric (e.g., cosine distance, Euclidean distance, Manhattan distance, or a variety of other distance metrics) to determine a similarity score for two embeddings. If the similarity score satisfies a threshold (e.g., is less than a threshold distance, is greater than a threshold score, etc.), the DP system 102 may determine that the two embeddings or their corresponding data samples match. In some embodiments, an embedding may represent a single data sample. In some embodiments, an embedding may represent a plurality of data samples. For example, a first embedding may represent the subset of data samples in the second dataset, and a second embedding may represent the first set of spurious data samples. By using embeddings and a similarity metric (e.g., a distance metric) to compare data samples, the DP system 102 may be able to determine that the subset of samples corresponds to a set of spurious data samples, even if the samples do not exactly match. This may enable the DP system 102 to detect a cybersecurity incident, even if a malicious actor makes some modifications to data samples in the first dataset.

In some embodiments, the DP system 102 may store an identifier associated with the first or second set of spurious data samples. For example, in response to replacing the first set of spurious data samples, the DP system 102 may store an identifier associated with the second set of spurious data samples, where the identifier includes an embedding of the second set of spurious data samples. In one use case, the DP system 102 may generate the embedding of the second set of spurious data samples and store the embedding as the identifier (or as part of the identifier) in association with the second set of spurious data samples.

The DP system 102 may determine a time window in which a cybersecurity incident occurred. The time window may be a timestamp that indicates a particular time (e.g., 3:23 am, etc.). The time window may be a time window between the time when the first set of spurious data samples was added to the first dataset and the time when the second set of spurious data samples were added to the first dataset. In one example, based on the subset of samples of the second dataset matching the first set of spurious data samples, the DP system 102 may determine a time window in which a cybersecurity incident occurred. The time window may correspond to a time before the first set of spurious data samples were replaced with the second set of spurious data samples.

The DP system 102 may output an indication of the time window that was determined as described above. For example, the DP system 102 may send a beginning timestamp (e.g., corresponding to a time when the first set of spurious data samples were added to the first dataset) and an ending timestamp (e.g., corresponding to a time when the second set of spurious data samples replaced the first set of spurious data samples in the first dataset) to a user device.

In some embodiments, the DP system 102 may determine one or more recommendations or changes to make to one or more computing devices (e.g., the computing device 108 or the user device 104) based on the determined time window. The DP system 102 may determine what settings were in place during a suspected cybersecurity incident and modify them to prevent other cybersecurity incidents from occurring in the future. The DP system 102 may determine a setting of a computing device associated with the cybersecurity incident, where the setting was active during the time window. Based on the setting, the DP system 102 may generate a recommendation for a modified setting. The modified setting may be predicted (e.g., using a machine learning model such as a model described above in connection with FIG. 3) to prevent the cybersecurity incident from repeating.

In some embodiments, the DP system 102 may use the determined time window to determine a version of software that was installed when a cybersecurity incident occurred. The DP system 102 may store records indicating when software was updated and may be able to determine the version of software that was used during the time window. The DP system 102 may generate one or more recommendations based on the software versions. In one example, the DP system 102 may determine a software version of software associated with the cybersecurity incident, where the software version of the software was installed during the time window. Based on the software version, the DP system 102 may generate a recommendation. For example, the DP system 102 may generate a recommendation indicating that the software be updated to a later version. As an additional example, the DP system 102 may generate a recommendation indicating that a policy related to software updates should be modified (e.g., because the latest software version was not installed at the time of the cybersecurity incident and modifying a policy may increase the likelihood that software is updated more quickly, etc.).

In one example, the DP system 102 may determine a modification to a value of a first data sample of the set of original data samples (e.g., modifying a value of a data record, a value of metadata for the data record, etc.). The modification may cause the machine learning model to output a class (e.g., an incorrect class) that is different from a label associated with the first data sample. The DP system 102 may generate a spurious data sample that includes the label associated with the first data sample and the modified value (e.g., the result of the modification made to the value of the first data sample). Additionally, or alternatively, the DP system 102 may add additional data to the spurious data sample (e.g., adding an additional attribute and a value of the attribute to the spurious data record, adding additional metadata to the spurious data record, etc.) As an example, to increase metadata complexity for further identification, the DP system 102 may add one or more geographic locations associated with the spurious data sample (e.g., locations from which a data record is purportedly created or modified), one or more departments or other organizational structures to which the spurious data sample is associated (e.g., a department that purportedly "owns" the data record), one or more users associated with the spurious data sample (e.g., an author or creator of the data record, a modifier that modified content of the data record, other users to which the data record is assigned, a user that downloaded or otherwise accessed the data record, etc.), one or more devices through which access of the spurious data sample occurred, or other information.

Figure 3:
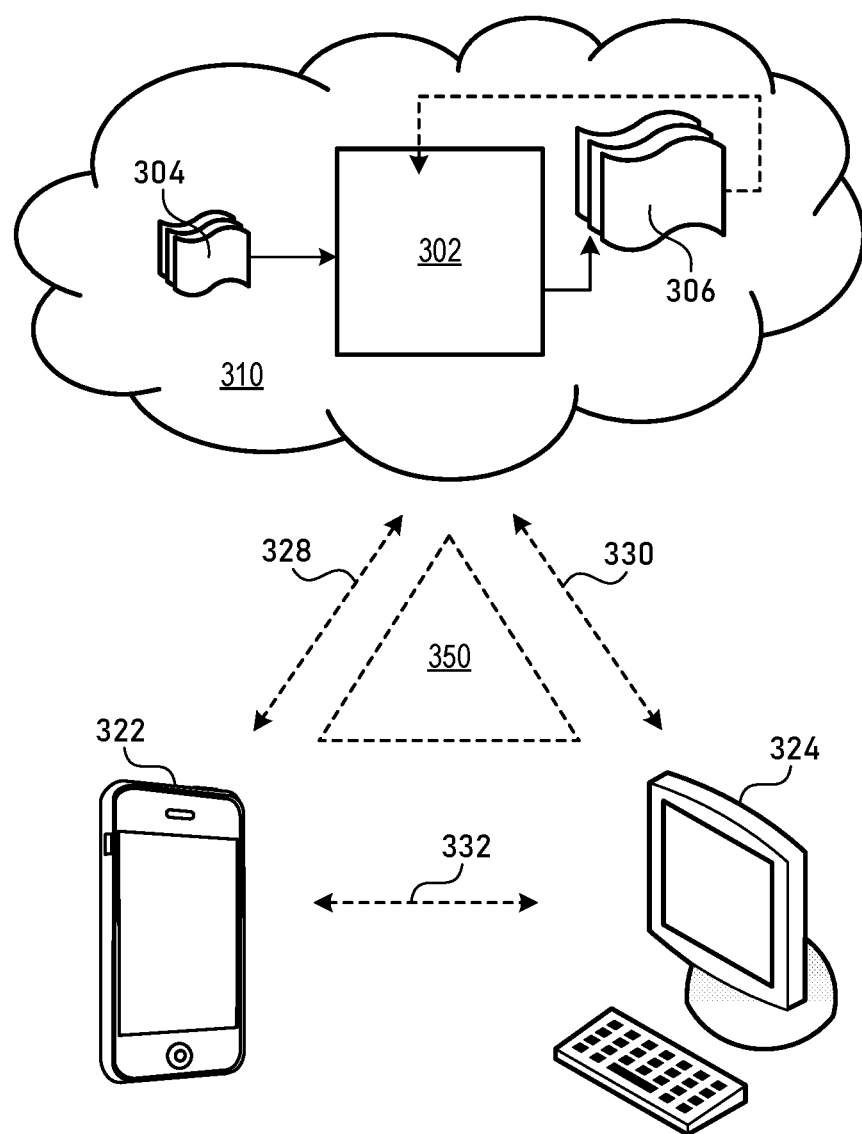
FIG. 3 shows illustrative components for a system that may be used with spurious data samples, in accordance with one or more embodiments.

FIG. 3 shows illustrative components for a system 300 used for training machine learning models or using machine learning models (e.g., to generate spurious data samples or perform any other action described in connection with FIGS. 1-6), in accordance with one or more embodiments. The components shown in system 300 may be used to perform any of the functionality described above in connection with FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, mobile devices, and/or any device or system described in connection with FIGS. 1-2B and 4. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may include any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., data related to spurious data samples or any other data described in connection with FIGS. 1-6).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays, and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to training machine learning models or using machine learning models (e.g., to generate spurious data samples or perform any other action described in connection with FIGS. 1-6).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the DP system 102 or any other device or component described in connection with FIG. 1.

Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, where the first labeled feature input is labeled with a known prediction for the first labeled feature input. The system may then train the first machine learning model to classify the first labeled feature input with the known prediction (e.g., to generate spurious data samples or perform any other action described in connection with FIGS. 1-6).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The model (e.g., model 302) may be used to generate spurious data samples or perform any other action described in connection with FIGS. 1-6.

System 300 also includes application programming interface (API) layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may employ incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

Figure 4:
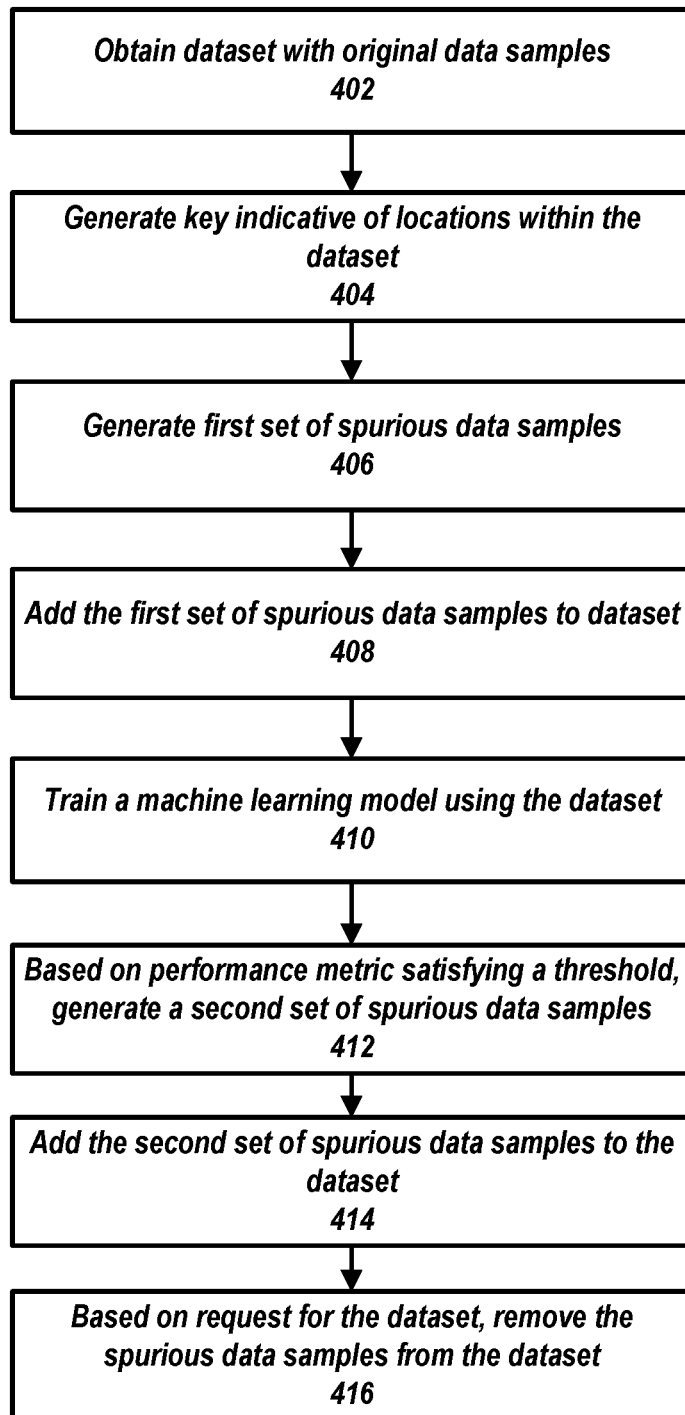
FIG. 4 shows a flowchart of the steps involved in determining whether additional spurious data samples should be added to a dataset, in accordance with one or more embodiments.

FIG. 4 shows a flowchart of the steps involved in determining whether additional spurious data samples should be added to a dataset, in accordance with one or more embodiments. Although described as being performed by a computing system, one or more actions described in connection with process 400 of FIG. 4 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 402, the computing system may obtain a dataset with original data samples. An original data sample may be any data that is not created for the purpose of degrading a machine learning model's performance. An original data sample may include any data that is deemed useful for training a machine learning model to improve the performance of the machine learning model. An original data sample may be a data sample that is not a spurious data sample. In one example, the computing system may obtain a first dataset that includes a set of original data samples. Each data sample includes a label indicating a correct classification.

At step 404, the computing system may generate a key indicative of one or more locations within the dataset. The key may indicate one or more locations within the first dataset where spurious data should be stored. For example, the key may indicate a plurality of rows where spurious data should be stored. In this example, the key may indicate that spurious data should be stored in every other row of the first dataset. The key may be a data structure (e.g., a list, a vector, a set, etc.) that contains each row number where spurious data is stored in the first dataset.

At step 406, the computing system may generate a first set of spurious data samples. For example, the computing system may generate, based on the set of original data samples, a first set of spurious data samples for the first dataset. The first set of spurious data samples, when used (e.g., along with the original data samples in the first dataset) to train a first machine learning model, may cause the first machine learning model to generate incorrect output for more than a threshold number of data samples of the set of original data samples. In some embodiments, the computing system may generate spurious data samples (e.g., the first set or a second set of spurious data samples) using one or more explainable artificial intelligence techniques (e.g., using counterfactual samples, using feature impact measurements, etc.), for example, as described above in connection with FIG. 1.

At step 408, the computing system may add the first set of spurious data samples to the first dataset. For example, the computing system may determine locations in the first dataset where the spurious samples should be placed and insert spurious data samples into the determined locations. The computing system may determine the locations based on the key that was generated in step 404. For example, the computing system may insert a spurious data sample into each row that is included in a data structure (e.g., if the key is a data structure as described above). By doing so, the computing system may increase the security of the computing system, for example, because the dataset will be difficult to use by a malicious actor or computing device due to the mixture of original and spurious data samples.

At step 410, the computing system may train a machine learning model using the first dataset. The machine learning model may be trained using both spurious data samples and original data samples in the first dataset. The machine learning model may be a model that learns using unsupervised training, supervised training, semi-supervised training, reinforcement learning, or a variety of other training techniques. The machine learning model may be a neural network, a clustering model, a support vector machine, a decision tree, or a variety of other models. The computing system may determine a performance level or metric associated with the trained machine learning model. If the machine learning model performs better than a threshold level, the computing system may determine that additional spurious data should be added to the first dataset.

At step 412, the computing system may generate a second set of spurious data samples. The computing system may generate the second set of spurious data samples, for example, based on a performance metric of the machine learning model satisfying a threshold. For example, if the machine learning model is performing at a level that is higher than the threshold, there may not be enough spurious data samples in the first dataset and the computing system may add additional spurious datasets to the first dataset to achieve a desired performance decrease. The computing system may repeat the steps of adding spurious data samples and training the model, for example, until the model performs below a threshold level. In one example, the performance metric used to determine whether additional spurious data samples should be added to the first dataset may include accuracy, precision, recall, an amount of loss or error measured in connection with the model, an F1 score, mean squared error, logarithmic loss, or a variety of other metrics.

At step 414, the computing system may add the second set of spurious data samples to the first dataset. For example, spurious samples of the second set of spurious data samples may be added to the dataset at locations indicated by the key described above. In some embodiments, the computing system may determine random locations, and add spurious data samples from the first set or second set of spurious data samples to the random locations. The computing system may store the locations or an indication of the locations of each spurious data sample that is added to the first dataset so that they can be removed from the first dataset (e.g., so that the computing system or a different computing device may use the first dataset to train a machine learning model without spurious data samples).

At step 416, the computing system may remove spurious data samples from the first dataset, for example, based on a request for the dataset. For example, if a computing device makes a request to use the first dataset for training a machine learning model, the computing system may remove the spurious data samples from the first dataset. In one example, the computing system may determine that the first dataset is to be used to train a machine learning model. Based on determining that the first dataset is to be used to train the machine learning model, the computing system may remove the first set of spurious data samples from the first dataset. By doing so, the spurious data samples may be prevented from interfering with the training of a model. The computing system may authenticate the computing device that made the request prior to removing the spurious data samples. By doing so, the computing system may enable intended devices from using the first dataset to train a model, and may prevent malicious computing devices from obtaining a dataset that has no spurious data samples.

In some embodiments, the computing system may determine at what point the spurious data samples should be removed from the first dataset. The first dataset may be sent to a variety of computing devices (e.g., that may be part of the computing system) for processing and the computing system may determine whether the spurious data samples should be removed before or after a computing device has finished processing the dataset. The computing system may determine whether the spurious data samples should be removed before or after a computing device has finished processing the dataset, for example, based on a determination of cybersecurity risk associated with the computing device. For example, the computing system may determine a computing device that has experienced more than a threshold amount of cybersecurity attacks within a time period (e.g., a threshold time period). Based on the computing device having experienced more than the threshold amount of cybersecurity attacks within the time period, the computing system may remove (e.g., or cause another computing device to remove) the first set of spurious data samples from the first dataset after the computing device has completed processing (e.g., preprocessing) the first dataset.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
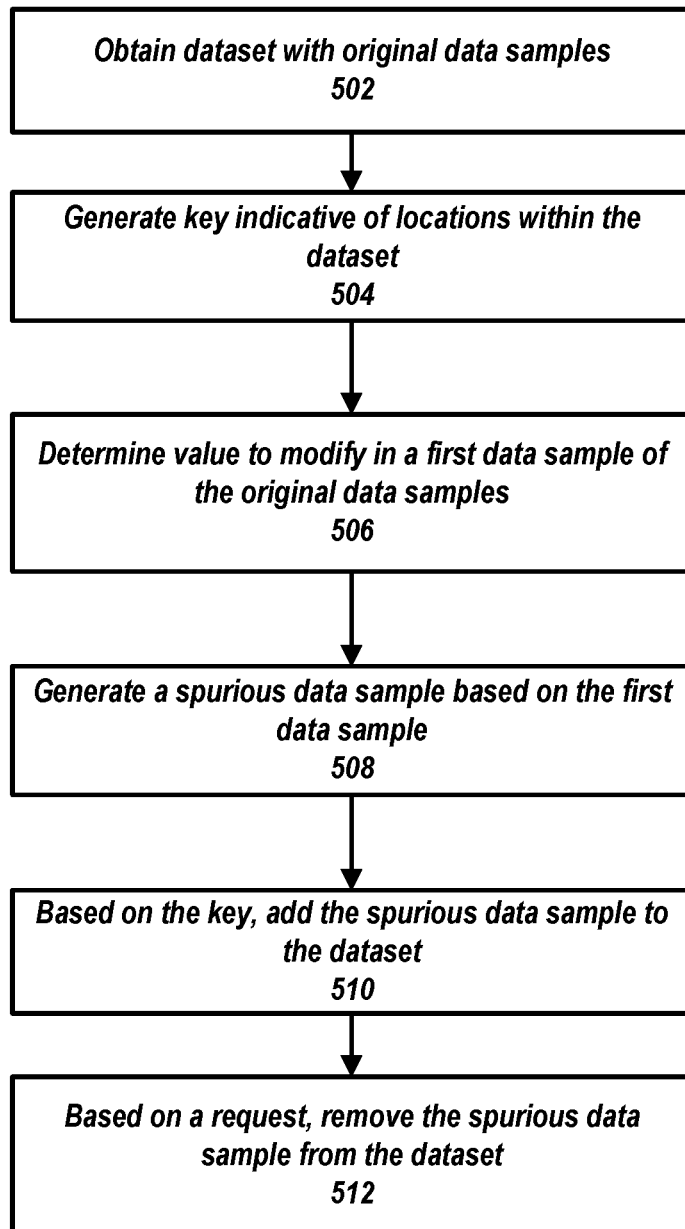
FIG. 5 shows a flowchart of the steps involved in generating spurious data samples that may be used in degrading a machine learning model's performance, in accordance with one or more embodiments.

FIG. 5 shows a flowchart of the steps involved in generating spurious data samples that may be used in degrading a machine learning model's performance, in accordance with one or more embodiments. Although described as being performed by a computing system, one or more actions described in connection with process 500 of FIG. 5 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 502, the computing system may obtain a dataset. The dataset may include original data samples, for example, such as any original data sample described above in connection with FIG. 1. One or more data samples of the original data samples may include a label indicating output that a machine learning model should generate given the corresponding data sample as input. For example, a label for a data sample may indicate the correct classification of the data sample.

At step 504, the computing system may generate a key indicative of locations within the dataset. The key may indicate one or more locations within the first dataset where spurious data should be stored. For example, the key may indicate a plurality of rows where spurious data should be stored. In this example, the key may indicate that spurious data should be stored in every other row of the first dataset. The key may be a data structure (e.g., a list, a vector, a set, etc.) that contains each row number where spurious data is stored in the first dataset.

At step 506, the computing system may determine a value to use in generating a spurious data sample. The computing system may determine a value to modify to generate a spurious data sample. For example, the computing system may determine a modified value associated with a first data sample of the set of original data samples. The modified value may cause a machine learning model to generate output that does not match a label associated with the first data sample. For example, if the value in the first data sample is replaced by the modified value, the machine learning model may generate output that does not match the label associated with the first data sample (e.g., the machine learning model may output a different classification, a different prediction, etc.).

In some embodiments, the computing system may generate spurious data samples (e.g., the first set or a second set of spurious samples) using one or more explainable artificial intelligence techniques. For example, the computing system may generate, based on a first data sample of a set of original data samples, an explanation indicating a feature that is more influential than other features of the first data sample for output generated by the machine learning model (e.g., the output may be output that the machine learning model generated based on the first data sample). The computing system may generate a spurious data sample of a first set of spurious data samples by generating a copy of the first data sample and modifying a value of the copy of the first data sample. The value that is modified may be the value in the sample that corresponds to the feature.

In one example, the computing system may generate a set of impact scores. The set of impact scores may include a plurality of impact scores for each data sample in a set of original data samples. The set of impact scores may indicate an amount of influence one or more features had on a machine learning model's output. The computing system may determine, based on the set of impact scores, a first cluster of impact scores. For example, the computing system may use K-means, DBSCAN, or a variety of other clustering techniques to generate a plurality of clusters that includes the first cluster of impact scores. The computing system may select the first cluster from the plurality of clusters. The computing system may determine, based on the first cluster of impact scores, a modified value for the first data sample. For example, the computing system may determine that a first feature was more influential to a model's output than any other feature for each data sample associated with the first cluster of impact scores. The computing system may determine a modified value that is outside the distribution (e.g., or that is more than a threshold number of standard deviations from the mean of the distribution) of values for the first feature for the samples associated with the first cluster.

A spurious data sample may be a counterfactual sample that corresponds to a sample in the set of original data samples. For example, the computing system may determine a modification to a value of a first data sample of the set of original data samples. The modification may cause the machine learning model to output a class (e.g., an incorrect class) that is different from a label associated with the first data sample. The computing system may generate a spurious data sample that includes the label associated with the first data sample and the modified value (e.g., the result of the modification made to the value of the first data sample).

At step 508, the computing system may generate a spurious data sample based on the first data sample. For example, the computing system may generate a copy of the first data sample and replace the value with the modified value determined in step 506. The computing system may store the copy as a spurious data sample.

In some embodiments, the computing system may generate a set of spurious data samples based on a distribution of values for a feature in the first dataset. For example, the computing system may determine a distribution of values for a feature in the first dataset. The computing system may generate a first set of spurious data samples, where each data sample in the first set of spurious data samples includes a value for the feature that is more than a threshold number of standard deviations from a mean of the distribution. The computing system may add each spurious data sample in the first set of spurious data samples to the first dataset.

In some embodiments, the computing system may generate a spurious data sample by swapping values between data samples in the first dataset. For example, the computing system may determine a first data sample and a second data sample in the set of original data samples. The computing system may select a first value corresponding to a feature of the first data sample and a second value corresponding to the feature of the second data sample. The computing system may swap the first and second values to generate a first spurious data sample (e.g., corresponding to the first data sample) and/or a second spurious data sample (e.g., corresponding to the second data sample). The first spurious data sample or the second data sample may be modified copies of their corresponding data samples. For example, the unmodified first data sample and the unmodified second data sample may remain in the first dataset.

At step 510, the computing system may add the spurious data sample to the first dataset. For example, the computing system may add the spurious data sample to the first dataset based on the key generated at step 504. For example, the computing system may determine a location in the first dataset where the spurious data sample should be placed or may insert the spurious data sample into a determined location. The computing system may determine the locations based on the key that was generated in step 504. For example, the computing system may insert the spurious data sample into a row that is indicated by a data structure (e.g., if the key is a data structure). By doing so, the computing system may increase the security of the computing system, for example, because the dataset will be difficult to use by a malicious actor or computing device due to a mixture of original and spurious data samples.

At step 512, the computing system may remove the spurious data sample from the dataset. The spurious data sample may be removed from the dataset, for example, based on a request from a computing device. The computing system may determine that the first dataset is to be used to train a machine learning model. Based on determining that the first dataset is to be used to train the machine learning model, the computing system may remove the first set of spurious data samples from the first dataset. By doing so, the spurious data samples may be prevented from interfering with the training of a model. The computing system may authenticate the computing device that made the request prior to removing the spurious data samples. By doing so, the computing system may enable intended devices from using the first dataset to train a model, and may prevent malicious computing devices from obtaining a dataset that has no spurious data samples.

In some embodiments, the computing system may generate visualizations associated with a spurious data sample. For example, the computing system may generate a user interface including a first element representative of the first data sample and a second element representative of the spurious data sample. The computing system may cause output of the user interface.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
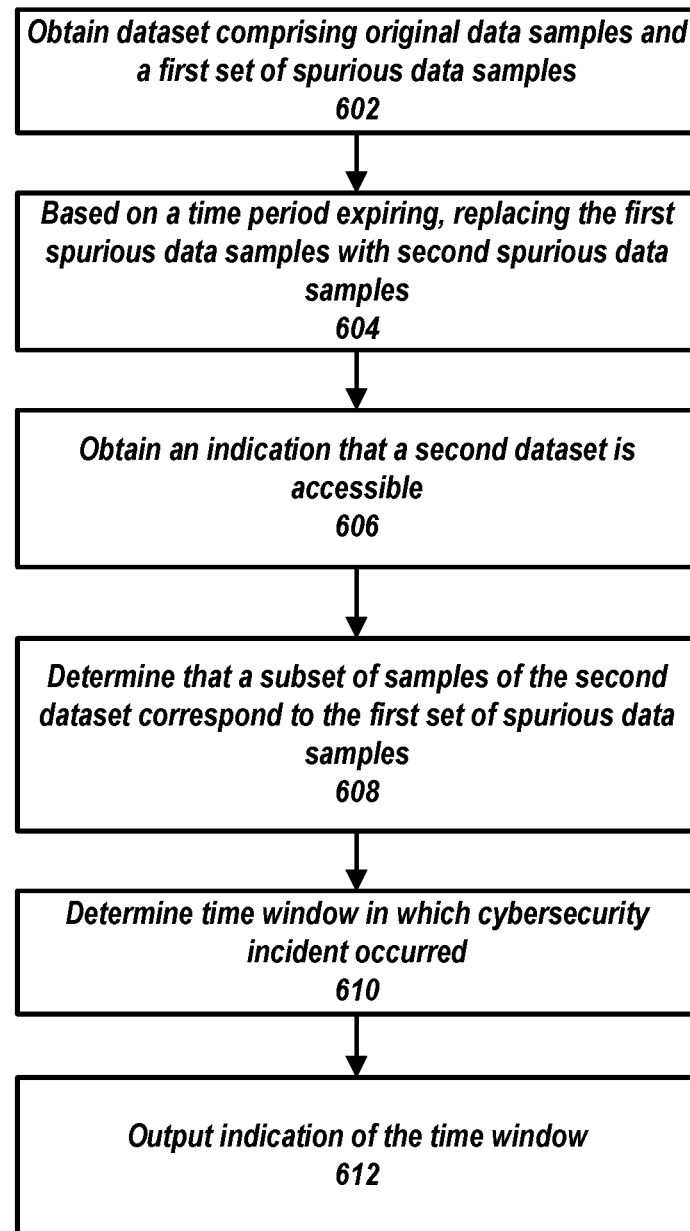
FIG. 6 shows a flowchart of the steps involved in using spurious data samples to determine when a cybersecurity incident may have occurred.

FIG. 6 shows a flowchart of the steps involved in using spurious data samples to determine when a cybersecurity incident may have occurred, in accordance with one or more embodiments. Although described as being performed by a computing system, one or more actions described in connection with process 600 of FIG. 6 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 602, the computing system may obtain a first dataset that includes original data samples and a first set of spurious data samples. The original data samples may include any original data samples described above in connection with FIGS. 1-5. The first set of spurious data samples may be any set of spurious data samples or include any spurious data sample described above in connection with FIGS. 1-5. The spurious data samples of the first set of spurious data samples may be stored at locations (e.g., locations identifiable by a key) within the first dataset. In some embodiments, the first set of spurious data samples may be configured to decrease accuracy of a machine learning model by more than a threshold percentage amount. In one example, by training a machine learning model using the first dataset that includes the first set of spurious data samples, the model's performance (e.g., accuracy, precision, recall, loss, etc.) may decrease by more than a threshold percentage amount.

At step 604, the computing system may replace the first spurious data samples with a second set of spurious data samples. For example, based on a time period expiring, the computing system may replace the first set of spurious data samples in the first dataset with a second set of spurious data samples. By doing so, the computing system may be able to determine what set of spurious data samples was included in a dataset at what time. This may enable the computing system to know when a cybersecurity incident (e.g., a data leak) occurred because the computing system may be able to identify the time based on what spurious data samples are contained in a leaked dataset.

In some embodiments, the first set of spurious data samples and the second set of spurious data samples may include different numbers of spurious data samples. For example, the first set of spurious data samples may make up a first percentage of the total number of samples (e.g., including original and spurious data samples) included in the first dataset. In this example, the second set of spurious data samples may make up a second percentage of the total number of samples included in the first dataset.

In one example, the computing system may determine a first percentage corresponding to a number of data samples in the first dataset that belong to the first set of spurious data samples. The computing system may determine a second percentage of the first dataset. The computing system may generate the second set of spurious data samples, where the number of data samples in the second set of spurious data samples corresponds to the second percentage. Based on generating the second set of spurious data samples, the computing system may replace the first set of spurious data samples with the second set of spurious data samples.

In some embodiments, the first set of spurious data samples may be removed from the first dataset and the second set of spurious data samples may be inserted into locations that are different from where the first set of spurious data samples was located within the first dataset. In one example, replacing the first set of spurious data samples in the first dataset with the second set of spurious data samples may include determining a second key indicative of locations within the first dataset that are different from the locations of samples of the first set of spurious data samples within the first dataset; and based on the locations indicated by the second key, adding the second set of spurious data samples to the first dataset. In some embodiments, the first set of spurious data samples may be left in the first dataset, and the second set of spurious data samples may be added to the first dataset such that the first dataset includes both the first set of spurious data samples and the second set of spurious data samples.

At step 606, the computing system may obtain an indication that a second dataset is accessible. For example, the computing system may obtain an indication that a second dataset is accessible via a third-party computing device. The second dataset may be a version of the first dataset that was leaked or stolen and made available via the third-party computing device. The computing system may attempt to determine when the second dataset was stolen, for example, as described in more detail below.

At step 608, the computing system may determine that a subset of data samples of the second dataset corresponds to the first set of spurious data samples. For example, the computing system may determine that the second dataset includes one or more spurious data samples from the first set of spurious data samples described in step 602 above. In some embodiments, the computing system may determine whether a subset of data samples of the second dataset correspond to the first set of spurious data samples by comparing a first data sample of the first set of spurious data samples with a second data sample of the second dataset to determine whether the first data sample and the second data sample are the same. In one example, if each value in the first data sample matches each corresponding value in the second data sample, the computing system may determine that a subset of samples of the second dataset correspond to the first set of spurious data samples. In one example, if a subset of the values in the first data sample match corresponding values (e.g., values for corresponding features) in the second data sample, the computing system may determine that a subset of data samples of the second dataset correspond to the first set of spurious data samples.

In some embodiments, the computing system may use a hash (e.g., a cryptographic hash) to determine whether a subset of samples of the second dataset corresponds to the first set of spurious data samples. The computing system may store one or more hashes corresponding to the first set of spurious data samples. For example, the computing system may store a single hash of the entire first set of spurious data samples. The computing system may generate a hash of a subset of samples of the second dataset. In one example, the computing system may generate a first hash of the subset of samples of the second dataset. Based on the first hash matching a second hash associated with the first set of spurious data samples, the computing system may determine that the subset of samples corresponds to the first set of spurious data samples.

In some embodiments, the computing system may use one or more embeddings to determine whether a subset of samples of the second dataset matches the first set of spurious data samples. The embeddings may be generated using a machine learning model (e.g., a model described above in connection with FIG. 3). The computing system may compare a first embedding corresponding to a first sample in the first set of spurious data samples with a second embedding corresponding to a second sample in the subset of samples of the second dataset. The comparison may be made using a similarity metric. For example, the computing system may use a distance metric (e.g., cosine distance, Euclidean distance, Manhattan distance, or a variety of other distance metrics) to determine a similarity score for two embeddings. If the similarity score satisfies a threshold (e.g., is less than a threshold distance, is greater than a threshold score, etc.), the computing system may determine that the two embeddings or their corresponding data samples match. In some embodiments, an embedding may represent a single data sample. In some embodiments, an embedding may represent a plurality of data samples. For example, a first embedding may represent the subset of data samples in the second dataset, and a second embedding may represent the first set of spurious data samples. By using embeddings and a similarity metric (e.g., a distance metric) to compare data samples, the computing system may be able to determine that the subset of samples corresponds to a set of spurious data samples, even if the samples do not exactly match. This may enable the computing system to detect a cybersecurity incident, even if a malicious actor makes some modifications to data samples in the first dataset.

In some embodiments, the computing system may store an identifier associated with the first or second set of spurious data samples. For example, based on replacing the first set of spurious data samples, the computing system may store an identifier associated with the second set of spurious data samples, where the identifier includes an embedding of the second set of spurious data samples.

At step 610, the computing system may determine a time window in which a cybersecurity incident occurred. The time window may be a timestamp that indicates a particular time (e.g., 3:23 am, etc.). The time window may be a time window between the time when the first set of spurious data samples was added to the first dataset and the time when the second set of spurious data samples was added to the first dataset. In one example, based on the subset of samples of the second dataset matching the first set of spurious data samples, the computing system may determine a time window in which a cybersecurity incident occurred. The time window may correspond to a time before the first set of spurious data samples was replaced with the second set of spurious data samples.

At step 612, the computing system may output an indication of the time window determined at step 610. For example, the computing system may send a beginning timestamp (e.g., corresponding to a time when the first set of spurious data samples was added to the first dataset) and an ending timestamp (e.g., corresponding to a time when the second set of spurious data samples replaced the first set of spurious data samples in the first dataset) to a user device.

In some embodiments, the computing system may determine one or more recommendations or changes to make to one or more computing devices based on the time window determined at step 610. The computing system may determine what settings were in place during a suspected cybersecurity incident and modify them to prevent other cybersecurity incidents from occurring in the future. The computing system may determine a setting of a computing device associated with the cybersecurity incident, where the setting was active during the time window. Based on the setting, the computing system may generate a recommendation for a modified setting. The modified setting may be predicted (e.g., using a machine learning model such as a model described above in connection with FIG. 3) to prevent the cybersecurity incident from repeating.

In some embodiments, the computing system may use the time window determined at step 610 to determine a version of software that was installed when a cybersecurity incident occurred. The computing system may store records indicating when software was updated and may be able to determine the version of software that was used during the time window. The computing system may generate one or more recommendations based on the software versions. In one example, the computing system may determine a software version of software associated with the cybersecurity incident, where the software version of the software was installed during the time window. Based on the software version, the computing system may generate a recommendation. For example, the computing system may generate a recommendation indicating that the software be updated to a later version. As an additional example, the computing system may generate a recommendation indicating that a policy related to software updates should be modified (e.g., because the latest software version was not installed at the time of the cybersecurity incident and modifying a policy may increase the likelihood that software is updated more quickly, etc.).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: obtaining a first dataset comprising a set of first data samples (e.g., original data samples); generating a key that indicates a location within the first dataset where spurious data should be stored; generating, based on the set of first data samples, a first set of spurious data samples for the first dataset; based on the key, adding the first set of spurious data samples to the first dataset; based on determining that the first set of spurious data samples fails to modify performance of a machine learning model, adding a second set of spurious data samples to the first dataset; and based on determining a request to use the first dataset is not associated with a malicious computing device, removing the first set of spurious data samples and the second set of spurious data samples from the first dataset.
2. The method of the preceding embodiment, wherein adding the second set of spurious data samples to the first dataset comprises: training a machine learning model based on the first dataset; based on a performance metric of the machine learning model satisfying a threshold, generating a second set of spurious data, wherein the performance metric comprises accuracy, logarithmic loss, F1 score, precision, recall, or mean squared error; and based on the performance metric of the machine learning model satisfying the threshold, adding the second set of spurious data to the first dataset.
3. The method of any of the preceding embodiments, wherein generating the first set of spurious data samples comprises: generating, based on a first data sample of the set of first data samples, an explanation indicating a feature that is more influential than other features of the first data sample for output generated by the machine learning model, the output corresponding to the first data sample; and generating a spurious data sample of the first set of spurious data samples by: generating a copy of the first data sample; and modifying a value of the copy of the first data sample, the value corresponding to the feature.
4. The method of any of the preceding embodiments, wherein the first set of spurious data samples, when used to train the machine learning model, cause the machine learning model to generate incorrect output for more than a threshold number of data samples of the set of first data samples.
5. The method of any of the preceding embodiments, wherein generating the first set of spurious data samples comprises: determining a modification to a value of a first data sample of the set of first data samples, wherein the modification causes the machine learning model to output an incorrect class of the first data sample; and generating a spurious data sample comprising a label corresponding to the first data sample and a result of the modification.
6. The method of any of the preceding embodiments, wherein removing the first set of spurious data samples from the first dataset comprises: determining a computing device that has experienced more than a threshold amount of cybersecurity attacks within a time period; and based on the computing device having experienced more than the threshold amount of cybersecurity attacks within the time period, removing the first set of spurious data samples from the first dataset after the computing device has completed preprocessing the first dataset.
7. The method of any of the preceding embodiments, wherein removing the first set of spurious data samples from the first dataset comprises: determining that the first dataset is to be used to train a machine learning model; and based on determining that the first dataset is to be used to train the machine learning model, removing the first set of spurious data samples from the first dataset.
8. The method of any of the preceding embodiments, wherein generating the second set of spurious data samples comprises: comparing output of a first machine learning model with output of a second machine learning model; and based on the output of the first machine learning model satisfying a similarity threshold to the output of the second machine learning model, generating the second set of spurious data samples.
9. The method of any of the preceding embodiments, further comprising steps for generating the first set of spurious data samples.
10. The method of any of the preceding embodiments, wherein the key indicates a plurality of rows within the first dataset where spurious data samples should be placed.
11. A method comprising: obtaining a first dataset comprising a set of first data samples (e.g., original data samples); generating a key that indicates a location within the first dataset where spurious data should be stored; determining a modified value associated with a first data sample of the set of first data samples, wherein the modified value causes a machine learning model to generate output that does not match a label associated with the first data sample; generating, based on the first data sample, a spurious data sample comprising the modified value; based on the key, adding the spurious data sample to the first dataset; and based on a request for the first dataset, removing the spurious data sample from the first dataset.

12. The method of any of the preceding embodiments, wherein determining the modified value comprises: generating, based on a first data sample of the set of first data samples, an explanation indicating a feature that is more influential than other features of the first data sample for output generated by the machine learning model, the output corresponding to the first data sample; and generating the modified value by modifying a value of the first data sample, the value corresponding to the feature.

13. The method of any of the preceding embodiments, wherein determining a modified value comprises: determining a modification to a value of a first data sample of the set of first data samples, wherein the modification causes the machine learning model to output an incorrect class of the first data sample; and generating a spurious data sample comprising a label corresponding to the first data sample and a result of the modification.

14. The method of any of the preceding embodiments, further comprising: determining a distribution of values for a feature in the first dataset; and generating a first set of spurious data samples, wherein each data sample in the first set of spurious data samples comprises a value for the feature that is more than a threshold number of standard deviations from a mean of the distribution; and adding the first set of spurious data samples to the first dataset.

15. The method of any of the preceding embodiments, wherein determining a modified value comprises: generating a set of impact scores, wherein the set of impact scores comprises a plurality of impact scores for each data sample in the set of first data samples, wherein the set of impact scores indicate an amount of influence features had on a machine learning model's output; determining, based on the set of impact scores, a first cluster of impact scores; and determining, based on the first cluster of impact scores, the modified value, wherein the first data sample corresponds to a set of impact scores in the first cluster of impact scores.

16. The method of any of the preceding embodiments, wherein removing the spurious data sample from the first dataset comprises: determining a computing device that has experienced more than a threshold amount of cybersecurity attacks within a time period; and based on the computing device having experienced more than the threshold amount of cybersecurity attacks within the time period, removing the spurious data sample from the first dataset after the computing device has completed preprocessing the first dataset.

17. The method of any of the preceding embodiments, wherein removing the spurious data sample from the first dataset comprises: determining that the first dataset is to be used to train a machine learning model; and based on determining that the first dataset is to be used to train the machine learning model, removing the spurious data sample from the first dataset.

18. The method of any of the preceding embodiments, wherein the key indicates a plurality of rows within the first dataset where spurious data samples should be placed.

19. The method of any of the preceding embodiments, further comprising: generating a user interface comprising a first element representative of the first data sample and a second element representative of the spurious data sample; and outputting the user interface.

20. The method of any of the preceding embodiments, wherein determining a modified value comprises: determining a second data sample of the set of first data samples; and selecting a value corresponding to a feature of the second data sample.

21. A method comprising: obtaining a first dataset comprising a set of first data samples and a first set of spurious data samples; based on a time period expiring, replacing the first set of spurious data samples in the first dataset with a second set of spurious data samples; obtaining an indication that a second dataset is accessible via a third-party computing device; based on determining that a subset of samples of the second dataset corresponds to the first set of spurious data samples, determining a time window in which a cybersecurity incident occurred, wherein the time window corresponds to a time before the first set of spurious data samples were replaced with the second set of spurious data samples; and outputting an indication of the time window.

22. The method of any of the preceding embodiments, wherein replacing the first set of spurious data samples in the first dataset with the second set of spurious data samples comprises: determining a first percentage corresponding to a number of data samples in the first dataset that belong to the first set of spurious data samples; determining a second percentage of the first dataset; generating the second set of spurious data samples, wherein the number of data samples in the second set of spurious data samples corresponds to the second percentage; and based on generating the second set of spurious data samples, replacing the first set of spurious data samples with the second set of spurious data samples.

23. The method of any of the preceding embodiments, further comprising: determining a setting of a computing device associated with the cybersecurity incident, wherein the setting was active during the time window; and based on the setting, generating a recommendation for a modified setting, wherein the modified setting is predicted to prevent the cybersecurity incident from repeating.

24. The method of any of the preceding embodiments, further comprising: determining a software version of software associated with the cybersecurity incident, wherein the software version of the software was installed during the time window; and based on the software version, generating a recommendation.

25. The method of any of the preceding embodiments, wherein determining that the subset of samples of the second dataset corresponds to the first set of spurious data samples comprises: generating a first hash of the subset of samples; and based on the first hash matching a second hash associated with the first set of spurious data samples, determining that the subset of samples corresponds to the first set of spurious data samples.

26. The method of any of the preceding embodiments, further comprising steps for generating a spurious data sample.

27. The method of any of the preceding embodiments, further comprising: based on replacing the first set of spurious data samples, storing an identifier associated with the second set of spurious data samples, wherein the identifier comprises an embedding of the second set of spurious data samples.

28. The method of any of the preceding embodiments, wherein replacing the first set of spurious data samples in the first dataset with the second set of spurious data samples comprises: determining a second key indicative of locations within the first dataset that are different from the locations of samples of the first set of spurious data samples within the first dataset; and based on the locations indicated by the second key, adding the second set of spurious data samples to the first dataset.

29. A tangible, non-transitory, machine-readable medium storing instructions that, when executed by a data processing apparatus, cause the data processing apparatus to perform operations comprising those of any of embodiments 1-28.

30. A system comprising one or more processors; and memory storing instructions that, when executed by the processors, cause the processors to effectuate operations comprising those of any of embodiments 1-28.

31. A system comprising means for performing any of embodiments 1-28.

What is claimed is:

1. A method for increasing efficacy of spurious data for model degradation, the method comprising:
    obtaining a first dataset comprising a set of original data samples;
    generating a key that indicates a location within the first dataset where spurious data should be stored;
    determining a modified value associated with a first data sample of the set of original data samples, wherein the modified value causes a machine learning model to generate output that does not match a label associated with the first data sample, wherein determining the modified value comprises:
        generating a set of impact scores, wherein the set of impact scores comprises a plurality of impact scores for each data sample in the set of original data samples, wherein the set of impact scores indicate an amount of influence features had on a machine learning model's output;
        determining, based on the set of impact scores, a first cluster of impact scores; and
        determining, based on the first cluster of impact scores, the modified value, wherein the first data sample corresponds to a respective set of impact scores in the first cluster of impact scores;
    generating, based on the first data sample, a spurious data sample comprising the modified value;
    based on the key, adding the spurious data sample to the first dataset from the location; and
    based on a request for the first dataset to train the machine learning model, removing the spurious data sample from the first dataset, wherein removing the spurious data sample from the first dataset comprises:
        determining a computing device that has experienced more than a threshold amount of cybersecurity attacks within a time period; and
        based on the computing device having experienced more than the threshold amount of cybersecurity attacks within the time period, removing the spurious data sample from the first dataset after the computing device has completed preprocessing the first dataset.

2. The method of claim 1, wherein determining the modified value comprises:
    generating, based on the first data sample of the set of original data samples, an explanation indicating a feature that is more influential than other features of the first data sample for output generated by the machine learning model, the output corresponding to the first data sample; and
    generating the modified value by modifying a value of the first data sample, the value corresponding to the feature.

3. The method of claim 1, wherein determining the modified value comprises:
    determining a modification to a value of the first data sample of the set of original data samples, wherein the modification causes the machine learning model to output an incorrect class of the first data sample; and
    generating the spurious data sample comprising a label corresponding to the first data sample and a result of the modification.

4. The method of claim 1, further comprising:
    determining a distribution of values for a feature in the first dataset;
    generating a first set of spurious data samples, wherein each data sample in the first set of spurious data samples comprises a value for the feature that is more than a threshold number of standard deviations from a mean of the distribution; and
    adding the first set of spurious data samples to the first dataset.

5. The method of claim 1, wherein removing the spurious data sample from the first dataset comprises:
    determining that the first dataset is to be used to train the machine learning model; and
    based on determining that the first dataset is to be used to train the machine learning model, removing the spurious data sample from the first dataset.

6. The method of claim 1, wherein the key indicates a plurality of rows within the first dataset where spurious data samples should be placed.

7. The method of claim 1, further comprising:
    generating a user interface comprising a first element representative of the first data sample and a second element representative of the spurious data sample; and
    outputting the user interface.

8. The method of claim 1, wherein determining the modified value comprises:
    determining a second data sample of the set of original data samples; and
    selecting a value corresponding to a feature of the second data sample.

9. A non-transitory, computer-readable medium comprising instructions that when executed by one or more processors, cause operations comprising:
    obtaining a first dataset comprising a set of original data samples;
    generating a key that indicates a location within the first dataset where spurious data should be stored;
    determining a modified value associated with a first data sample of the set of original data samples, wherein the modified value causes a machine learning model to generate output that does not match a label associated with the first data sample, wherein determining the modified value comprises:
        generating a set of impact scores, wherein the set of impact scores comprises a plurality of impact scores for each data sample in the set of original data samples, wherein the set of impact scores indicate an amount of influence features had on a machine learning model's output;
        determining, based on the set of impact scores, a first cluster of impact scores; and determining, based on the first cluster of impact scores, the modified value, wherein the first data sample corresponds to a respective set of impact scores in the first cluster of impact scores;
generating, based on the first data sample, a spurious data sample comprising the modified value;
based on the key, adding the spurious data sample to the first dataset from the location; and
based on a request for the first dataset to train the machine learning model, removing the spurious data sample from the first dataset, wherein removing the spurious data sample from the first dataset comprises:
determining a computing device that has experienced more than a threshold amount of cybersecurity attacks within a time period; and
based on the computing device having experienced more than the threshold amount of cybersecurity attacks within the time period, removing the spurious data sample from the first dataset after the computing device has completed preprocessing the first dataset.

10. The medium of claim 9, wherein determining the modified value comprises:
generating, based on a first data sample of the set of original data samples, an explanation indicating a feature that is more influential than other features of the first data sample for output generated by the machine learning model, the output corresponding to the first data sample; and
generating the modified value by modifying a value of the first data sample, the value corresponding to the feature.

11. The medium of claim 9, wherein determining the modified value comprises:
determining a modification to a value of the first data sample of the set of original data samples, wherein the modification causes the machine learning model to output an incorrect class of the first data sample; and
generating the spurious data sample comprising a label corresponding to the first data sample and a result of the modification.

12. The medium of claim 9, further comprising:
determining a distribution of values for a feature in the first dataset;
generating a first set of spurious data samples, wherein each data sample in the first set of spurious data samples comprises a value for the feature that is more than a threshold number of standard deviations from a mean of the distribution; and
adding the first set of spurious data samples to the first dataset.

13. The medium of claim 9, wherein removing the spurious data sample from the first dataset comprises:
determining that the first dataset is to be used to train the machine learning model; and
based on determining that the first dataset is to be used to train the machine learning model, removing the spurious data sample from the first dataset.

14. The medium of claim 9, wherein the key indicates a plurality of rows within the first dataset where spurious data samples should be placed.

15. The medium of claim 9, wherein determining the modified value comprises:
determining a second data sample of the set of original data samples; and
selecting a value corresponding to a feature of the second data sample, wherein the selected value is used as the modified value.

16. A system for increasing efficacy of spurious data for model degradation, the system comprising:
one or more processors; and
a non-transitory, computer-readable medium comprising instructions that when executed by the one or more processors, cause operations comprising:
obtaining a first dataset comprising a set of original data samples;
generating a key that indicates a location within the first dataset where spurious data should be stored;
determining a modified value associated with a first data sample of the set of original data samples, wherein the modified value causes a machine learning model to generate output that does not match a label associated with the first data sample, wherein determining the modified value comprises:
generating a set of impact scores, wherein the set of impact scores comprises a plurality of impact scores for each data sample in the set of original data samples, wherein the set of impact scores indicate an amount of influence features had on a machine learning model's output;
determining, based on the set of impact scores, a first cluster of impact scores; and
determining, based on the first cluster of impact scores, the modified value, wherein the first data sample corresponds to a respective set of impact scores in the first cluster of impact scores;
generating, based on the first data sample, a spurious data sample comprising the modified value;
based on the key, adding the spurious data sample to the first dataset from the location; and
based on a request for the first dataset to train the machine learning model, removing the spurious data sample from the first dataset, wherein removing the spurious data sample from the first dataset comprises:
determining a computing device that has experienced more than a threshold amount of cybersecurity attacks within a time period; and
based on the computing device having experienced more than the threshold amount of cybersecurity attacks within the time period, removing the spurious data sample from the first dataset after the computing device has completed preprocessing the first dataset.

17. The system of claim 16, wherein determining the modified value comprises:
generating, based on the first data sample of the set of original data samples, an explanation indicating a feature that is more influential than other features of the first data sample for output generated by the machine learning model, the output corresponding to the first data sample; and
generating the modified value by modifying a value of the first data sample, the value corresponding to the feature.

18. The system of claim 16, wherein determining the modified value comprises:
determining a modification to a value of the first data sample of the set of original data samples, wherein the modification causes the machine learning model to output an incorrect class of the first data sample; and
generating the spurious data sample comprising a label corresponding to the first data sample and a result of the modification.

19. The system of claim 16, wherein the instructions further cause operations comprising:
- determining a distribution of values for a feature in the first dataset;
- generating a first set of spurious data samples, wherein each data sample in the first set of spurious data samples comprises a value for the feature that is more than a threshold number of standard deviations from a mean of the distribution; and
- adding the first set of spurious data samples to the first dataset.

* * * * *